United States Patent [19]

Kelley

[11] 3,887,015
[45] June 3, 1975

[54] CONVERTIBLE RIPPER AND GOUGER AND TOE TRIMMER

[76] Inventor: Leon O. Kelley, P.O. Box 488, Stamford, Tex. 79553

[22] Filed: Apr. 30, 1973

[21] Appl. No.: 355,870

[52] U.S. Cl. .............. 172/254; 172/449; 172/464; 172/484; 172/491; 172/699; 172/702; 37/2 R
[51] Int. Cl.. A01b 63/10; A01b 63/32; A01g 23/06
[58] Field of Search .......... 172/254, 250, 245, 702, 172/714, 713, 740, 776, 315, 316, 804, 805, 699, 700, 444, 464, 484, 448, 449, 247, 777, 712, 748, 710, 491; 37/2 R, 193

[56] References Cited
UNITED STATES PATENTS

| | | | |
|---|---|---|---|
| 2,370,830 | 3/1945 | Arps | 172/254 |
| 2,734,290 | 2/1956 | Tuttle | 172/448 X |
| 2,895,236 | 7/1959 | Pilch | 37/2 R |
| 3,027,027 | 3/1962 | Bles | 37/2 R |
| 3,461,971 | 8/1969 | Sprenkel | 172/710 |
| 3,503,456 | 3/1970 | Larson | 172/699 |
| 3,539,018 | 11/1970 | Sprenkel | 172/484 |
| 3,603,007 | 9/1971 | Naber et al. | 37/2 R |
| 3,657,831 | 4/1972 | Kant | 172/254 X |

FOREIGN PATENTS OR APPLICATIONS

| | | | |
|---|---|---|---|
| 742,431 | 9/1966 | Canada | 172/491 |
| 212,365 | 8/1957 | Australia | 172/448 |
| 1,010,489 | 11/1965 | United Kingdom | 37/2 R |
| 627,458 | 11/1961 | Italy | 172/254 |

*Primary Examiner*—Edgar S. Burr
*Assistant Examiner*—Steven A. Bratlie
*Attorney, Agent, or Firm*—Richards, Harris & Medlock

[57] ABSTRACT

The specification discloses a ripper plow assembly which may be connected to operate either as a gouger or as a highway cut toe trimmer depending upon the mounting position of a ripper shank in the assembly. To operate as a gouger, the ripper shank is connected such that the toe of the shank points toward the prime mover. A hydraulically actuated cylinder may then be operated to pivot the shank relative to the plow in order to disengage boulders, slabs and the like. To operate as a toe trimmer, the ripper shank is mounted such that the toe of the shank points away from the prime mover. The hydraulic cylinder may then be operated to pivot the shank relative to the plow in order to cut or scrape the toe of a highway cut. The shank, when in this trimmer position, may also be utilized to gouge out boulders or the like while scrapping up the highway cut.

1 Claim, 5 Drawing Figures

CONVERTIBLE RIPPER AND GOUGER AND TOE TRIMMER

FIELD OF THE INVENTION

This invention relates to ripper plows, and more particularly relates to a ripper plow assembly which may operate either as a ripper gouger or as a highway cut toe trimmer.

THE PRIOR ART

During ripping operations with a conventional ripper plow, the ripper shank sometimes comes into contact with an extremely large boulder, slab or other rigid obstacle. Due to the fact that the ripper shank is moving laterally against the object, it is often quite difficult to pull the ripper plow through the obstacle, and time is then required to dig the obstacle up or perhaps blast out the obstacle with dynamite or the like. The need has thus arisen for a ripper plow assembly which could be operated to gouge out boulders or obstacles.

In addition, when conventional scrapers are utilized to make sloped highway cuts during highway construction, the scrapers often tends to bounce and thus the toe, or lowest part of the cut, tends to "run down" or to become misshaped. This requires time-consuming and expensive additional work in order to make additional passes with the scraper to shape the toe of the highway cut according to specifications. In some instances, blasting is required in order to construct the desired highway cut. A need has thus arisen for a technique for easily shaping or trimming the toe area of highway cuts.

SUMMARY OF THE INVENTION

In accordance with the present invention, an assembly is provided which may be mounted on a ripper plow frame and operated to gouge out boulders and the like during ripping operations or alternatively may be operated to trim or shape the toe in a highway cut. The present device may thus be operated to substantially eliminate or reduce the problems which have occurred in the prior devices noted above.

In accordance with a more specific aspect of the invention, a plow assembly includes a tool bar for connection to a prime mover. A shank support is connected to the rearward end of the tool bar and a shank having a curved lower toe is mounted in the shank support. A pivot pivotally connects the shank within the shank support in either first or second position. In the first position, the toe of the shank extends away from the prime mover and in the second position the toe of the shank points toward the prime mover. A fluid pressure operated cylinder is mounted on the shank support and is connected at one end to the shank. The cylinder may thus be operated to selectively pivot the shank about the pivot point to dig a toe in a highway cut in the first position or to act as a gouger in the second position.

In accordance with another aspect of the invention, a ripper gouger includes a tool bar for connection to a prime mover. A shank support is connected to the rearward end of a tool bar. A ripper shank having a curved lower toe is mounted in the shank support such that curved lower toe points toward the prime mover. A pivot on the shank support mounts the shank for pivotal movement relative to the shank support. A fluid pressure operated cylinder is mounted on the shank support and pivotally connects at one end to the other portion of the shank. A system is provided to operate the cylinder to pivot the shank back and forth about the pivot means in order to dislodge heavy objects in the path of travel of the shank.

In connection with yet another aspect of the invention, a ripper plow includes a tool bar in connection behind the prime mover. A shank support is connected to the rearward end of the tool bar. A ripper shank has a curved lower toe and is mounted in the shank support such that the curved lower toe points away from the tool bar. A pivot in the shank support mounts the shank for pivotal movement relative to the shank support. A fluid pressure operated cylinder is mounted on the shank support and is connected at one end to the upper end of the shank. A system operates the cylinder to pivot the shank about the pivot, such that the toe moves in a reciprocating rearward motion which may be utilized to cut a toe in a highway cut.

DESCRIPTION OF THE DRAWINGS

For a more complete understanding of the invention, and for further objects and advantages thereof, reference is now made to the following description taken in conjunction with the accompanying drawings, in which.

DESCRIPTION OF THE PREFERRED EMBODIMENT

Figure 1:
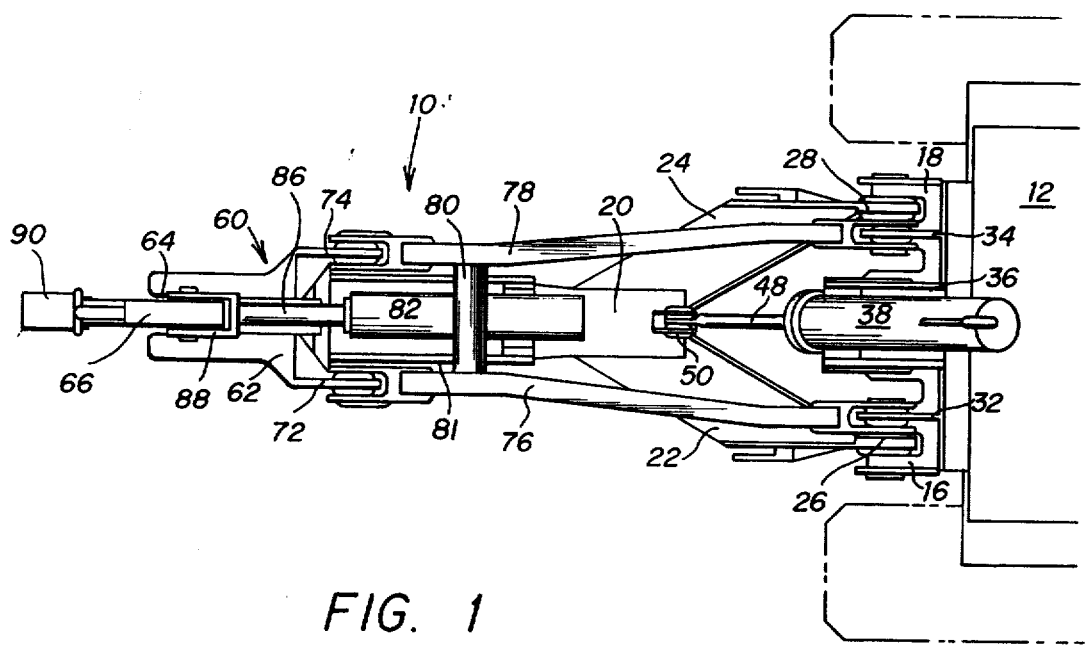
FIG. 1 is a top view of the plow assembly mounted for operation as a highway cut assembly.
Figure 2:
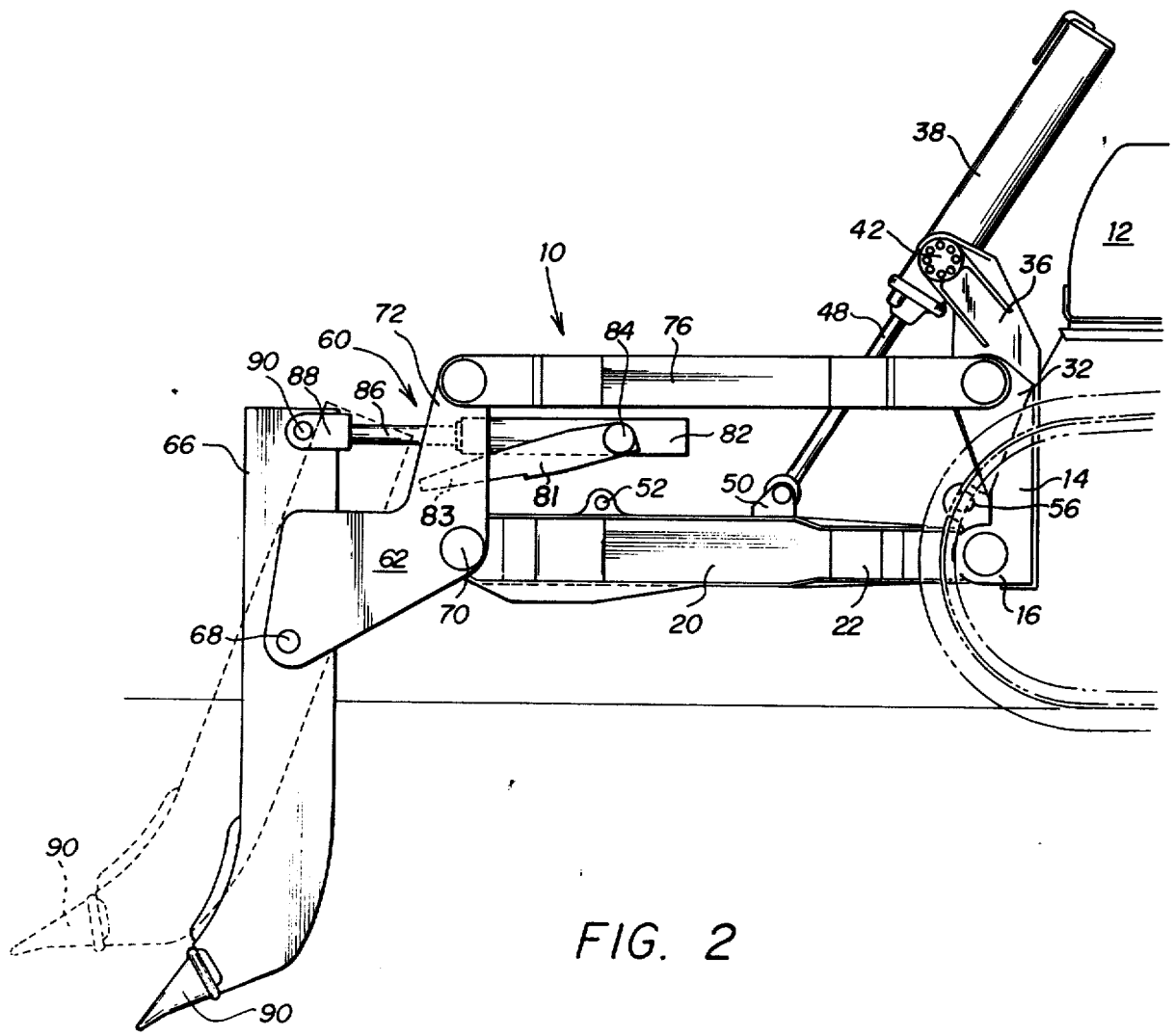
FIG. 2 is a side view of the plow shown in FIG. 1 mounted in a parallelogram lift configuration.

Referring to FIGS. 1 and 2, the construction and operation of the plow assembly 10 will be described. A prime mover 12 may comprise for example a caterpiller tracter or the like and an upstanding hitch frame 14 is rigidly connected to the rear of the prime member 12. The frame 14 includes a pair of spaced apart lug assemblies 16 and 18 at the lower end thereof.

A tool bar 20 includes a pair of outwardly diverging arms 22 and 24 having ears 26 and 28 at the forward end thereof. Ear 26 is received and pinned within the lug assembly 16, while ear 28 is received and pinned within the lug assembly 18. The outwardly diverging arms 22 and 24 of the tool bar 20 form a generally V-shaped configuration, while the rearward end of the tool bar 20 is elongated and relatively narrow.

A pair of lugs 32 and 34 extend rearwardly from and are rigidly connected to the upper part of the frame 14. Lugs 32 and 34 are disposed on opposite sides of an upwardly extending hydraulic cylinder support 36. The cylinder support 36 has a generally U-shaped cross-section and is rigidly connected to the hitch frame 14. A hydraulic cylinder 38 is pivotally mounted in an inclined position in an opening in the upper portion of the support 36. Trunnions 42 extend through aperatures in the cylinder support 36 to pivotally connect the cylinder 38 within the cylinder support 36. Similar trunnion mountings for hydraulic cylinders are presently utilized and are commercially available on the KR-25D Ripper Plow manufactured and sold by the Kelley Products Division of CRC-Crose International, Inc. Hydraulic lines leading to the cylinder 38 are omitted for clarity of illustration, but the hydraulic control system of the prime mover 12 is connected to the cylinder 38 to enable control thereof. The output shaft 48 from the cylinder 38 is pivotally pinned at the lower end thereof between a lug assembly 50 which is connected at the apex of the arms 22 and 24 of the tool bar 20.

A pair of lugs 52 are spaced apart a short distance on the tool bar 20 to enable connection of the plow in a radial configuration in the manner shown and described in FIGS. 12 and 13 of the co-pending patent application Ser. No. 146,253, filed May 24, 1971 by the present applicant and entitled "Ripper Plow Assembly for Converting Parallel Lift to Radial Lift." A second pair of lugs 56 (only one of which is shown in FIG. 2) are spaced apart on the frame 14 to enable attachment of the plow assembly as a radial plow in the manner shown and described in FIGS. 10 and 11 of the copending patent application Ser. No. 146,253, previously noted.

A shank assembly 60 constructed according to the invention comprises a shank supporting housing 62 having a generally open ended slot 64 in the rear end thereof for receiving a ripper shank 66. The ripper shank 66 is pinned within the housing 62 by a pin 68 in order to enable pivotal movement of the shank 66 relative to the housing 62. The housing 62 is pinned to the rearward end of the tool bar 20 by pin 70. The housing 62 includes a pair of upstanding ears 72 and 74. The upper portion of the ears 74 are pinned to the ends of a pair of linkage bars 76 and 78 which are rigidly connected by a cross bar 80. When it is desired to interconnect the plow assembly in a parallelogram configuration, the ends of the bars 76 and 78 are pinned to the upper portions of the lugs 32 and 34 in the manner shown in FIGS. 1 and 2. As will be subsequently described, when it is desired to connect the plow assembly in a radial lift configuration, the forward ends of the bars 76 and 78 are pinned to the spaced apart lugs 56.

A second cylinder support 81 having a generally U-shaped cross-section is rigidly connected, as by welding, at 83 between the upstanding ears 72 and 74 of the housing 62. A second hydraulic cylinder 82 is connected by trunnions 84 to the cylinder support 80. The cylinder rod 86 of the cylinder 82 is connected to a generally U-shaped yoke 88 which is pinned at pins 90 to the upper portion of the shank 66. Hydraulic connections, not shown, extend from the cylinder 82 to the hydraulic control panel of the prime mover 12 in order to enable selective operation of the cylinder.

Figure 4:
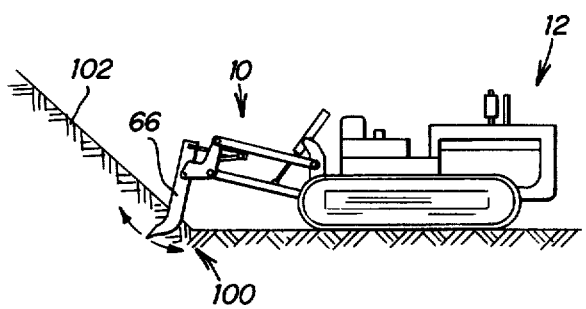
FIG. 4 is a somewhat diagramatical view illustrating operation of the present plow assembly in the construction of a highway cut.

As shown in FIG. 2, the shank 66 includes a lower curved toe 90 which in this position is mounted facing away from the prime mover 12. The cylinder 82 may thus be operated to pivot the shank 66 about the pivot point 68 such that the toe 90 reciprocates rearwardly of the plow assembly. As shown in FIG. 4, plow assembly 10 may be utilized to trim up the toe area generally designated as 100 of a sloped highway cut 102. The prime mover 12 need only be backed up to the toe area 100 and the shank 66 forced into the toe area desired to be trimmed. The shank 66 is then reciprocated in order to dig out and trim the toe to the specified shape.

If desired, higher portions of the sloped highway at 102 may also be trimmed by the present system by backing prime mover 12 up the slope and utilizing the reciprocating shank 66 to trim the cut. In addition, the shank 66 may be utilized in this manner to dislodge heavy obstacles such as boulders or the like which ordinarily would require blasting.

Figure 3:
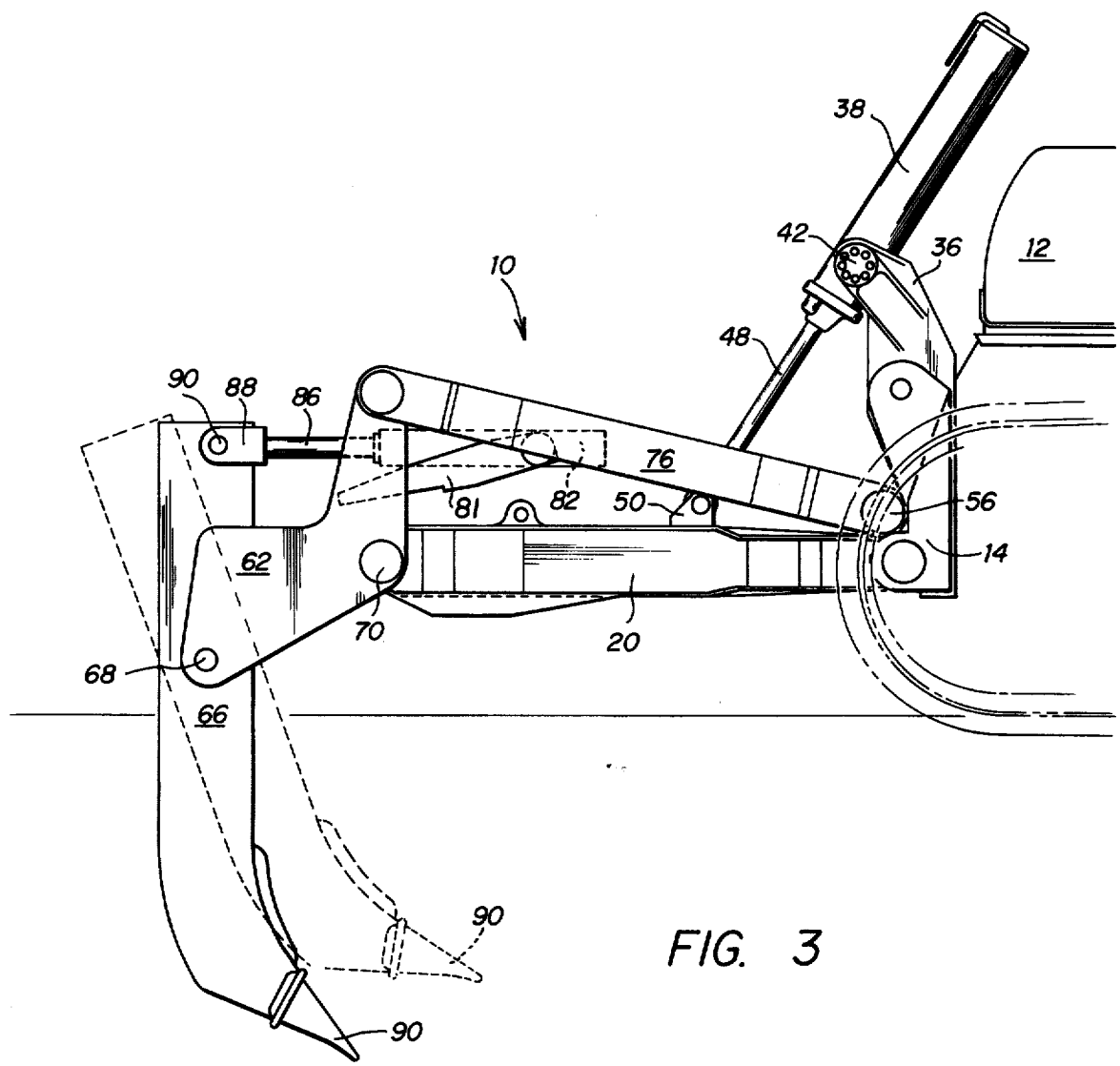
FIG. 3 is a side view of the plow assembly of the invention mounted in the position for operation as a gouger and also mounted in a radial lift configuration.
Figure 5:
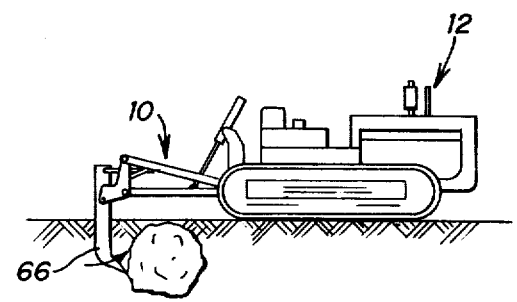
FIG. 5 illustrates the operation of the present plow assembly when operating as a gouger.

FIGS. 3 and 5 illustrate the present plow assembly 10 interconnected in a second position for use as a ripper gouger. Like numerals are utilized in FIG. 3 for like and corresponding parts previously described. The assembly in FIG. 3 is identical to that shown in FIG. 2, with the exception that the shank 66 has been unpinned at 68 and 90 and turned around relative to the housing 62, such that the toe 90 points toward the prime mover 12. In addition, the linkage bar 76 and 78 have been disengaged from the upper portion of lugs 32 and 34 and pinned instead to the spaced apart lugs 56 to connect the plow assembly in a radial lift configuration. The assembly when connected in the manner shown in FIG. 3 may be operated to pivot the shank 66 about the pivot 68 relative to housing 62 to exert through the toe 90 a large upward force. This reciprocating upward force may be utilized to great advantage in removing large obstacles such as boulders or slabs in the path of the ripper plow. For example, FIG. 5 illustrates the use of the plow assembly 10 wherein the shank 66 is pivoted in order to dislodge a larger boulder buried in the ground.

The cylinder 82 and cylinder rod 86 are constructed to enable a substantial amount of movement of the toe of the shank 66. As an example, in a typical configuration, the toe 90 is moved over an interval of two feet in order to exert dislodging force upon large boulders. With the use of the present system, blasting or other expensive steps often required to disengage large boulders is often not required.

It will be understood that the assembly, when operated either in the manner shown in FIG. 2 or FIG. 3, may be alternatively interconnected with the use of bars 76 and 78, in a radial lift configuration or a parallelogram lift configuration. If desired, the system may be interconnected in the manner shown in FIG. 3 and may be operated as a conventional ripper, until it is desired to disengage a large obstacle in the path of the ripper. The present system thus provides an extremely flexible and versatile ripper tool which may be easily changed out into either one of two positions to enable a variety of tasks to be accomplished by this system.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A plow assembly comprising:
   a frame having first, second, third and fourth links for connection to a prime mover; means on said first link for rigid connection to the prime mover; said second link comprising a pair of parallel spaced linkage bars, a cross-bar rigidly connecting said spaced linkage bars; a first connection means on said first link for selectively pivotally connecting one end of each of said linkage bars at a first point on said first link; a second connection means on said first link for selectively pivotally connecting said one end of each of said linkage bars to a second point on said first link; said third link positioned to extend parallel to said second link when said second link is connected to said first link at the first point of connection; said third link having a pair of outwardly diverging arms at one end, said outwardly diverging arms having their ends pivotally connected to said first link at a point spaced away from the first and second points of connection of said second link, said third link extending parallel to said second link when said second link is connected to said first link at the first point; said fourth link pivotally attached between the ends of said linkage bars of said second link opposite the ends connected to said first link and the end opposite said diverging portion of said third link;

a first variable link hydraulic cylinder assembly with one end pivotally attached to said first link and the other end pivotally attached to said third link for raising and lowering said frame relative to said first link, said cylinder being centrally positioned to extend between said bars of said second link;

a shank assembly having a shank and a downwardly curved toe, said shank being pivotally connected to said fourth link in either a first or second position, said toe pointing down and away from said first link in said first position and down and towards said first link in said second position; and a second variable link hydraulic cylinder positioned to extend between said bars of said second link and with one end pivotally connected to said fourth link and with its other end pivotally connected to said shank on said shank assembly, said second cylinder operable to pivot said shank with respect to said fourth link to operate said plow assembly as a highway cut trimmer when said shank is in said first position and as a gouger when said shank is in said second position.

* * * * *